Aug. 11, 1942.   C. N. CROSS   2,292,744
PICTURE MOUNT
Filed Jan. 29, 1940   2 Sheets-Sheet 1
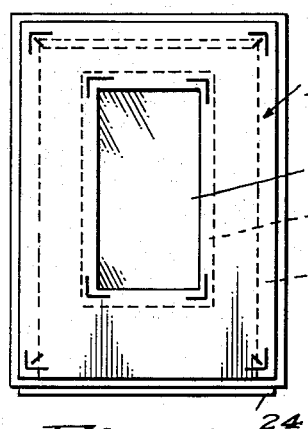
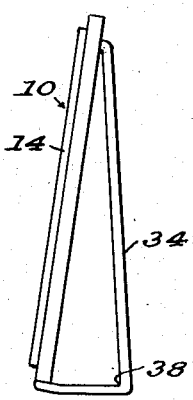
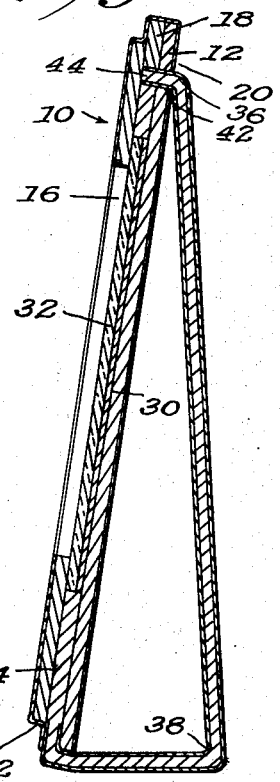
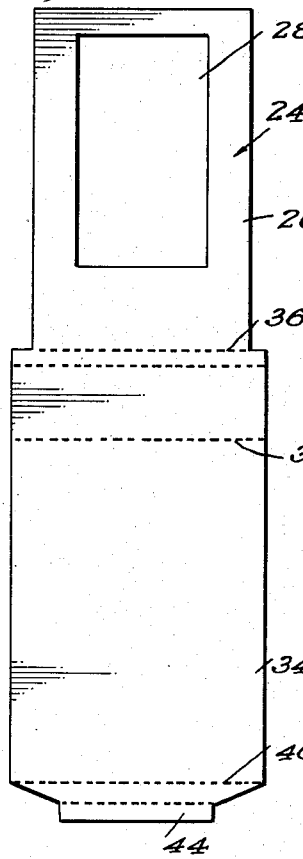
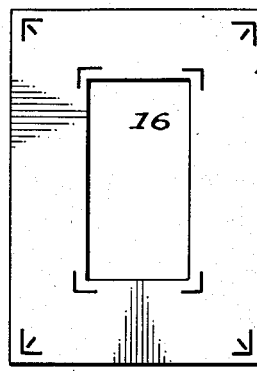
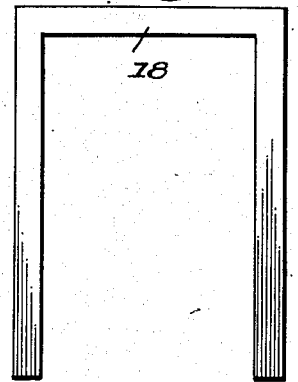
Inventor
CARROLL N. CROSS.
Attorney Aug. 11, 1942.      C. N. CROSS      2,292,744
PICTURE MOUNT
Filed Jan. 29, 1940      2 Sheets-Sheet 2

Inventor
CARROLL N. CROSS
By
Attorney

Patented Aug. 11, 1942

2,292,744

UNITED STATES PATENT OFFICE 2,292,744

PICTURE MOUNT

Carroll N. Cross, Middleboro, Mass.

Application January 29, 1940, Serial No. 316,253

8 Claims. (Cl. 40—152.1)

This invention relates to picture mounts adapted to the display of photographs or the like.

Picture mount faces are ordinarily ornamented in a great variety of designs to appeal to the aesthetic senses of prospective purchasers, but because of limited storage space, photographers have found it impossible to carry in stock more than a few different mount styles. It is, therefore, the prime object of this invention to provide a picture mount for which many different face designs may be stocked, although only a minimum amount of space is available for such purpose.

The primary object of the invention is accomplished by providing a picture mount composed of two separable members; one member including a face board which may be suitably ornamented, and the other member being a picture carrying insert of a standard construction which adapts it to use with any one of a number of differently ornamented face members in the formation of a complete mount.

More particularly the invention contemplates a picture mount comprising a picture holding insert encasing member having a backboard and a suitably ornamented faceboard having a picture display window therein. For use in cooperative relation with the picture holding insert encasing member, there is provided a picture holding insert having a portion with which a picture or the like may be associated, which portion is adapted to pass through a passage formed in the picture holding insert encasing member at one or more edges thereof between the backboard and the facing member. Furthermore, the picture holding insert includes a second portion which is adapted to extend beyond the picture encasing member to form a support for the mount in picture displaying position.

Other objects and advantages of the invention, such as the greatly facilitated manner in which a picture may be mounted, will appear as the description thereof proceeds with reference to the drawings forming a part of the application.

In the drawings there are illustrated, by way of example, two forms in which the invention may be embodied. In these drawings like reference numerals indicate like parts, and:

Figure 1 is a front elevation of one form of the picture mount in accordance with the invention;

Figure 2 is a side elevational view;

Figure 3 is a vertical sectional view taken on a plane perpendicular to the face of the mount;

Figure 4 is a plan view of a picture holding insert;

Figure 5 is a plan view of the faceboard forming a part of the picture holding insert encasing member;

Figure 6 is a plan view of the backboard forming a part of the picture holding insert encasing member;

Figure 7 is a plan view of a spacing member adapted for use in the picture holding insert encasing member;

Figure 8:
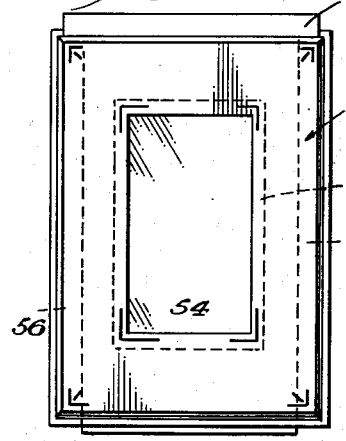
Figure 8 is a facial view of a modified form of the picture mount in accordance with the teaching of the invention.

The picture mount is composed of a picture holding insert encasing member 10 which includes in its construction a backboard 12 and a faceboard 14. The margins of the faceboard may be coextensive with the margins of the backboard 12 although a more pleasing appearance is produced if the margins of the faceboard 14 do not extend coextensively with the margins of the backboard 12. The faceboard 14 is provided with a display window 16 through which a picture or the like may be viewed. In most cases, the backboard 12 and the faceboard 14 should be assembled in spaced relation and such relation may be obtained by the use of a marginal spacing member 18 which is adapted to lie between the backboard 12 and the faceboard 14, along at least two edges thereof. The three members 12, 14, and 18, may be united in any suitable manner. One way in which the same may be joined is by the use of a flexible binding material 20, which is adapted to pass over the rear face of the backboard 12 and around the edges of one or more of the other members forming the picture holding insert encasing unit. It is contemplated that at least one edge of the member 10 be provided with a passage such as 22, shown in the drawings through which a picture holding insert 24 may be inserted.

The picture holding insert 24 more particularly shown in Figure 4 of the drawings, is composed of a portion 26 being adapted to carry a picture or the like. The portion 26 is of such length and width as to be received in snug engagement by the end and side walls of the picture holding insert encasing member 10 as particularly defined by the inner marginal edges of the spacing member 18.

The portion 26 of the picture holding insert may be provided with a well 28 which is adapted to receive a picture 30 and a transparent picture protective medium 32. The well 28 provides the necessary space within the assembled mount for the proper accommodation of a picture of ordinary thickness together with some transparent protective medium, such as glass or Celluloid.

The picture holding insert includes a second portion 34 which is adapted to lie outside of the picture holding insert encasing member 10 when the picture holding insert is assembled therewith in operative position. The portion 34 may be of such length and of such construction that the same may be used as a support or easel for the entire mount when the same is placed in display position. The insert 24 has suitable score lines 36, 38, and 40 formed at proper intervals along the face thereof, so that the same may be bent into a supporting structure such as shown in Figures 2 and 3 without danger of breaking or otherwise damaging the material from which the same is constructed.

The backboard is provided with slot 42 which is arranged to lie under the upper inner edge of the spacing member 18. The slot 42 is adapted to receive a tongue 44 formed on the outer end of the picture insert member 24, thus facilitating the arrangement of the outer portion 34 of the insert 24 in mount supporting position.

Figure 9:
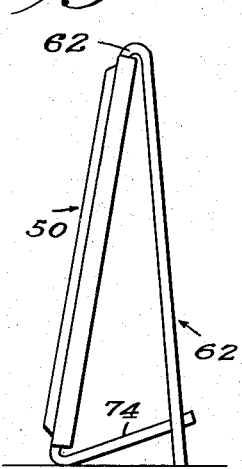
Figure 9 is an elevational view of the modified form of the invention as viewed from the side thereof.
Figure 10:
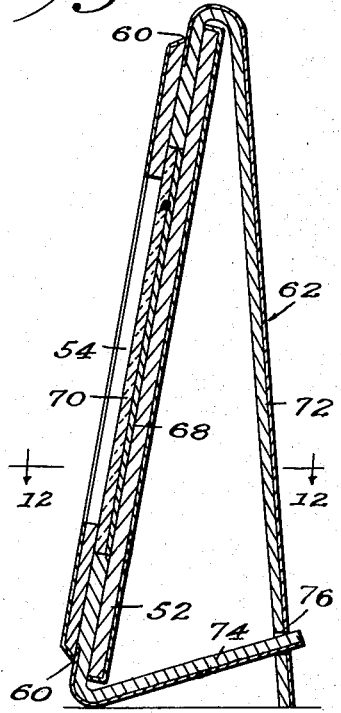
Figure 10 is an enlarged vertical sectional view taken on a line perpendicular to the face of the modified mount.
Figure 11:
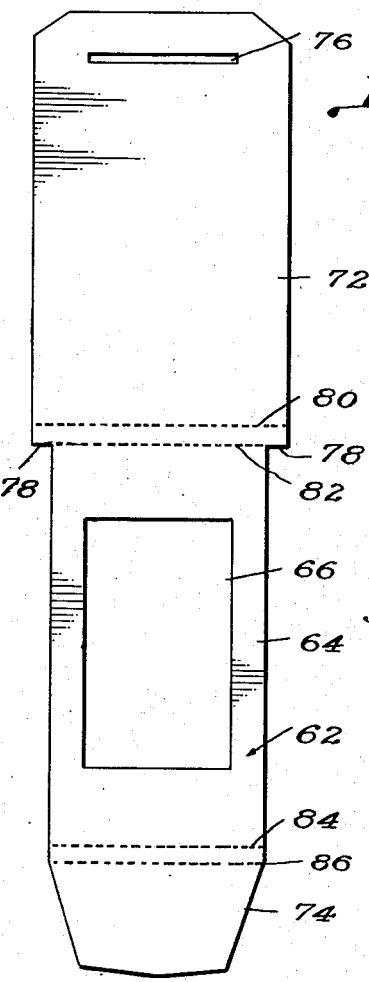
Figure 11 is a plan view of the picture holding insert adapted for use in the modified form of the mount; and, Figure 12 is a horizontal sectional view taken on lines 12—12 of Figure 10.
Figure 12:
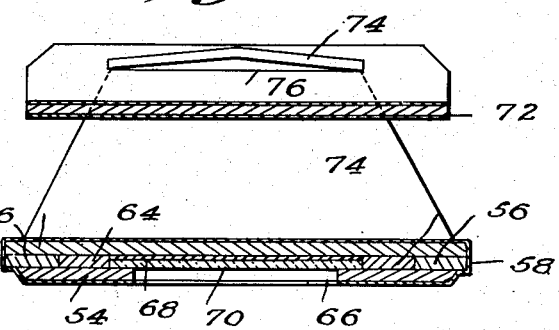

In Figures 8–12 inclusive is shown a modified form in which the invention may be embodied. In this form of the invention there is provided a picture holding insert encasing member 50 which is composed of a backboard 52, a faceboard 54 and preferably two spacing members 56 positioned along the vertical edges of the backboard and between the backboard 52 and the faceboard 54. These members may be joined in any suitable way along the two parallel vertical edges, such as by means of a flexible binding material 58.

It is evident that the faceboard and the backboard may be found by suitably bending a single piece of flexible sheet stock and joining the meeting edges in any suitable manner. It is further apparent that the spacing members may constitute unfolded edge portions of either the faceboard or the backboard. This construction provides a picture holding insert encasing member having opposite open edges 60 through which may be passed the picture holding insert 62. In this form of the invention the picture holding insert also comprises a portion 64 having therein a well 66 for the reception of a photograph 68 and a transparent photograph protective medium 70. The portion 64 of the picture holding insert 62 is reduced in width and is of such length as to be received in snug engagement within the picture holding insert encasing member 50, the internal width of which is defined by the inner edges of the vertical spacing members 56. The member spacing the faceboard from the backboard may be entirely eliminated from both forms of the invention and these boards may be held in spaced relation by the flexible binding material passing about their edges.

The picture holding insert 62 has a second portion 72 which is adapted to lie outside of the picture holding insert encasing member 50 when the two are placed in operative position. The portion 72 is adapted to form one leg of a supporting easel as particularly shown in Figures 9 and 10 of the drawings. The portion 64 of the picture holding insert has formed at the outer end thereof a tongue 74 which is adapted to form the other leg of the supporting easel.

In the modified form of the invention the portion 72 has formed therein a slot or passage 76 which is adapted to be engaged by the tongue 74 to maintain the same in display position, or in mount closing position when the member 72 is passed over the face of the mount.

In the use of the modified form of the invention the picture holding insert 62 is inserted through the passage 60 at the top of the picture holding insert encasing member 50 until shoulders 78 at the upper limit thereof come in contact with surfaces of the encasing member 50 and more particularly with the ends of the vertical spacing members 56. In this position the picture within the well 66 is brought into proper registration with a display window and then by virtue of the spaced series of score lines 80, 82, 84, and 86 the protruding portions 72 and 74 of the picture holding insert may be brought to the rear of the mount into the operative position shown in Figures 9 and 10 to form the desired support.

It will be observed from the foregoing that the invention, in the forms herein illustrated and described for the purpose of suggesting embodiments thereof only, comprises two separable members which make possible the production of picture holding insert encasing members having a great variety of facial ornaments. As a consequence of the construction in accordance with the invention, a single form or standard style of picture holding insert may be adopted and such form can then be used with any one of a multiplicity of facing designs which may be carried in stock. The invention may assume different forms and may be subject to numerous modifications and variations without departing from the spirit thereof as the same is defined by the terms of the subjoined claims.

I claim:

1. A picture mount comprising a picture holding insert encasing member having a backboard, a faceboard, parallel members disposed between said backboard and faceboard for spacing the same, means joining said backboard, spacing members and faceboard, a picture display window in said faceboard, a picture holding insert passage in at least one edge of said member and being located between said backboard and said faceboard, and a picture holding insert having a portion for associating therewith a picture or the like and being adapted to pass through said passage into picture displaying position under said window, said portion being of a sufficient width to frictionally engage said spacing means whereby the same is removably positioned in said encasing member, a second portion constituting an extension of said insert beyond an edge of said encasing member to form a support for said mount in picture displaying position, said second portion being of greater length than said encasing member and being joined to said first named portion of said insert by a flexible zone to permit bending of said second portion to a mount supporting position at the rear of said encasing member.

2. A picture mount comprising a picture holding insert encasing member having a backboard, a faceboard, parallel spacing members disposed between said backboard and said faceboard, means joining said backboard, spacing members and faceboard along at least two edges thereof, a picture display window in said faceboard, a picture holding insert passage in at least one edge of said encasing member and being located between said backboard and said faceboard, and a picture holding insert having a portion provided with a picture holding well and being adapted to pass through said passage into picture displaying position under said window, said portion being of a sufficient width to frictionally engage said spacing means whereby the same is removably positioned in said encasing member, a second portion constituting an extension of said insert beyond an edge of said encasing member to form a support for said mount in picture displaying position, said second portion being of greater length than said encasing member and being joined to said first named portion of said insert by a flexible zone to permit bending of said second portion to a mount supporting position at the rear of said encasing member.

3. A picture mount comprising a picture holding insert encasing member having a backboard, a faceboard, a spacing member disposed between said backboard and said faceboard along the two vertical edges and the top marginal edge thereof, means joining said backboard, spacing member and faceboard along the common marginal edges, a picture display window in said faceboard, a picture holding insert passage at the bottom marginal edge of said encasing member and being located between said backboard and said faceboard, and a picture holding insert having a portion for associating therewith a picture or the like and being adapted to pass through said passage into picture displaying position under said window, a second portion constituting a part of said insert extending beyond said encasing member to form a support for said mount in picture displaying position, said second portion being joined to said first portion by a flexible zone to permit bending thereof.

4. A picture mount comprising a picture holding insert encasing member having a backboard, a faceboard, means joining said faceboard to said backboard in spaced relation along two opposite edges thereof, a picture display window in said faceboard, picture holding insert passages in two oppositely disposed edges of said encasing member and being located between said backboard and said faceboard, and a picture holding insert having a portion for associating therewith a picture or the like and being adapted to pass through said passages into picture displaying position under said window, a second portion constituting a part of said insert extending beyond said encasing member to form a support for said mount in picture displaying position, said second portion being joined to said first portion by a flexible zone to permit bending.

5. A picture mount comprising a picture holding insert encasing member having a backboard, a faceboard, spacing members disposed between said backboard and faceboard at two oppositely disposed edges thereof, means joining said backboard, spacing members and facing member along said edges, a picture display window in said faceboard, a picture holding insert passage at two remaining oppositely disposed edges of said encasing member located between said backboard and said faceboard, and a picture holding insert having a portion for associating therewith a picture or the like and being adapted to pass through said passage into picture displaying position under said window, second portions constituting a part of said insert extending beyond said encasing member to form a support for said mount in picture displaying position, one of said second portions being longer than said first portion and both of said second portions being joined to said first portion by a flexible zone to permit bending.

6. A picture mount comprising a picture holding insert encasing member having a backboard, a faceboard, spacing members disposed in parallel relation along the two vertical edges between said backboard and faceboard, means joining said backboard, spacing members and faceboard along the vertical edges thereof, a picture display window in said faceboard, picture holding insert passages at the top and bottom edges of said encasing member and being located between said backboard and said faceboard, and a picture holding insert having a portion provided with a picture well and being adapted to pass through said passages into picture displaying position under said window, second portions constituting a part of said insert extending beyond said encasing member to form a support for said mount in picture displaying position, one of said second portions being longer than said first portion and both of said second portions being joined to said first portion by a flexible zone to permit bending.

7. A display mount comprising an indicia bearing insert encasing member having a backboard, a faceboard, means joining said faceboard to said backboard in spaced relation along two opposite edges thereof, an indicia display window in said faceboard, indicia holding insert passages in two oppositely disposed edges of said encasing member and being located between said backboard and said faceboard, an indicia bearing insert having a recessed indicia carrying well therein and being adapted to pass through said passages into indicia displaying position under said window, the length of said insert being sufficient to permit the ends thereof to extend beyond said passages when the same is in indicia displaying position, said ends being joined to said indicia holding portion by a flexible zone permitting bending thereof to form means for holding said mount in indicia displaying position.

8. A picture mount comprising a picture holding insert encasing member having a backboard, a faceboard, means joining said backboard to said faceboard in spaced relation along at least two opposite edges thereof, a picture display window in said faceboard, a slot in said backboard, a picture holding insert passage at one edge of said encasing member and being located between said backboard and said faceboard, a picture holding insert having a portion for holding a picture or the like under said display window and being adapted to pass into said picture holding insert passage, a second portion constituting a part of said insert extending beyond said encasing member to form a support for said mount in picture displaying position, said second portion being joined to said first portion by a flexible zone to permit bending, and a tongue at the free end of said second portion of said insert adapted to enter said slot in said backboard to secure said second portion of said insert in mount supporting position.

CARROLL N. CROSS.